United States Patent
McGinnis et al.

(10) Patent No.: US 9,187,361 B2
(45) Date of Patent: *Nov. 17, 2015

(54) METHOD OF MANUFACTURING S-GLASS FIBERS IN A DIRECT MELT OPERATION AND PRODUCTS FORMED THERE FROM

(75) Inventors: Peter B. McGinnis, Gahanna, OH (US); Douglas A. Hofmann, Hebron, OH (US)

(73) Assignee: OCV Intellectual Capital, LLC, Toledo, OH (US)

( * ) Notice: Subject to any disclaimer, the term of this patent is extended or adjusted under 35 U.S.C. 154(b) by 349 days.

This patent is subject to a terminal disclaimer.

(21) Appl. No.: 12/403,955

(22) Filed: Mar. 13, 2009

(65) Prior Publication Data
US 2010/0069220 A1    Mar. 18, 2010

Related U.S. Application Data

(63) Continuation-in-part of application No. 12/341,985, filed on Dec. 22, 2008, now Pat. No. 8,338,319, and a continuation-in-part of application No. 11/267,702, filed on Nov. 4, 2005, now Pat. No. 7,823,417, and a continuation-in-part of application No. 11/267,739, filed on Nov. 4, 2005, now Pat. No. 7,799,713.

(51) Int. Cl.
*C03B 32/00*    (2006.01)
*C03C 13/00*   (2006.01)
(Continued)

(52) U.S. Cl.
CPC ............... *C03C 13/00* (2013.01); *C03B 5/235* (2013.01); *C03B 5/43* (2013.01); *C03B 7/06* (2013.01);
(Continued)

(58) Field of Classification Search
CPC ........ C03B 5/2353; C03B 5/43; C03B 7/065; C03B 5/2356; C03B 7/06; C03B 37/02
USPC .......................................................... 65/474
See application file for complete search history.

(56) References Cited

U.S. PATENT DOCUMENTS 3,044,888 A    7/1962  Provance et al.
3,189,471 A    6/1965  Thomas
(Continued)

FOREIGN PATENT DOCUMENTS

CA    2528923    12/2004
CN    1113893    12/1995
(Continued)

OTHER PUBLICATIONS

Thomson Scientific, London, GB; AN 1983-50368K Database WPI Week 198321.
(Continued)

*Primary Examiner* — Queenie Dehghan
(74) *Attorney, Agent, or Firm* — Calfee, Halter & Griswold LLP

(57) ABSTRACT

A method of forming high strength glass fibers in a refractory-lined glass meter, products made there from and batch compositions suited for use in the method are disclosed. The glass composition for use in the method of the present invention is up to about 64-75 weight percent $SiO_2$, 16-24 weight percent $Al_2O_3$, 8-12 weight percent MgO and 0.25-3 weight percent $R_2O$, where $R_2O$ equals the sum of $Li_2O$ and $Na_2O$, has a fiberizing temperature less than about 2650° F., and a ΔT of at least 80° F. By using oxide-based refractory-lined furnaces the cost of production of glass fibers is substantially reduced in comparison with the cost of fibers produced using a platinum-lined melting furnace. High strength composite articles including the high strength glass fibers are also disclosed.

6 Claims, 4 Drawing Sheets

(51) Int. Cl.

| | |
|---|---|
| *C03B 5/235* | (2006.01) |
| *C03B 5/43* | (2006.01) |
| *C03C 3/085* | (2006.01) |
| *C03C 3/087* | (2006.01) |
| *C03C 3/091* | (2006.01) |
| *F23C 5/08* | (2006.01) |
| *C03B 7/06* | (2006.01) |

(52) U.S. Cl.
CPC ............... *C03B 7/065* (2013.01); *C03C 3/085* (2013.01); *C03C 3/087* (2013.01); *C03C 3/091* (2013.01); *F23C 5/08* (2013.01); *F23M 2900/05004* (2013.01)

(56) References Cited

U.S. PATENT DOCUMENTS

| | | |
|---|---|---|
| 3,220,915 A | 11/1965 | Shannon |
| 3,360,386 A | 12/1967 | Kelley et al. |
| 3,402,055 A | 9/1968 | Harris et al. |
| 3,408,213 A | 10/1968 | Provance et al. |
| 3,484,259 A | 12/1969 | Lewis et al. |
| 3,498,805 A | 3/1970 | Stalego |
| 3,524,738 A | 8/1970 | Grubb et al. |
| 3,535,096 A | 10/1970 | Bour et al. |
| 3,709,705 A | 1/1973 | Hagedorn |
| 3,804,646 A | 4/1974 | Dumbaugh, Jr. |
| 3,833,388 A | 9/1974 | Ohlberg |
| 3,861,926 A | 1/1975 | Irlam et al. |
| 3,876,481 A | 4/1975 | Erickson et al. |
| 3,887,386 A | 6/1975 | Majumdar |
| 3,892,581 A | 7/1975 | Burgman et al. |
| 3,902,881 A | 9/1975 | Pirooz |
| 3,904,423 A | 9/1975 | Guthrie |
| 3,945,838 A | 3/1976 | Erickson et al. |
| 4,002,482 A | 1/1977 | Coenan |
| 4,012,131 A | 3/1977 | Krohn |
| 4,046,948 A | 9/1977 | Zlochower |
| 4,063,001 A | 12/1977 | Zlochower |
| 4,090,882 A | 5/1978 | Rauschenfels |
| 4,199,364 A | 4/1980 | Neely |
| 4,325,724 A | 4/1982 | Froberg |
| 4,366,251 A | 12/1982 | Rapp |
| 4,375,527 A | 3/1983 | Zahner |
| 4,386,164 A | 5/1983 | Moser |
| 4,491,951 A | 1/1985 | Dunn |
| 4,569,471 A | 2/1986 | Ingemansson |
| 4,582,748 A | 4/1986 | Eastes |
| 4,764,487 A | 8/1988 | Lewis |
| 4,824,806 A | 4/1989 | Yokoi et al. |
| 4,857,485 A | 8/1989 | Brennan et al. |
| 4,882,302 A | 11/1989 | Horiuchi et al. |
| 4,892,846 A | 1/1990 | Rogers et al. |
| 4,935,291 A | 6/1990 | Gunnink |
| 4,976,587 A | 12/1990 | Johnston et al. |
| 5,212,121 A | 5/1993 | Omata |
| 5,248,637 A | 9/1993 | Taneda et al. |
| 5,302,444 A | 4/1994 | Jackson et al. |
| 5,332,699 A | 7/1994 | Olds et al. |
| 5,474,425 A | 12/1995 | Lawlor |
| 5,569,629 A | 10/1996 | TenEyck et al. |
| 5,576,252 A | 11/1996 | Rapp et al. |
| 5,585,312 A | 12/1996 | TenEyck et al. |
| 5,691,255 A | 11/1997 | Jensen et al. |
| 5,719,092 A | 2/1998 | Arrington |
| 5,789,329 A | 8/1998 | Eastes et al. |
| 5,819,614 A | 10/1998 | Jander |
| 5,843,853 A | 12/1998 | Heitmann |
| 5,851,932 A | 12/1998 | Dickson et al. |
| 5,935,886 A | 8/1999 | Jensen et al. |
| 5,948,535 A | 9/1999 | Chiurlo et al. |
| 5,962,354 A | 10/1999 | Fyles et al. |
| 5,997,977 A | 12/1999 | Zou et al. |
| 6,063,470 A | 5/2000 | Zou et al. |
| 6,069,100 A | 5/2000 | Naumann et al. |
| 6,089,021 A | 7/2000 | Senandayake |
| 6,101,847 A | 8/2000 | Shamp |
| 6,136,735 A | 10/2000 | Gallo et al. |
| 6,156,683 A | 12/2000 | Grove-Rasmussen et al. |
| 6,169,047 B1 | 1/2001 | Nishizwa et al. |
| 6,214,429 B1 | 4/2001 | Zou et al. |
| 6,237,369 B1 | 5/2001 | LeBlanc et al. |
| 6,248,678 B1 | 6/2001 | Pinckney |
| 6,300,264 B1 | 10/2001 | Ohara |
| 6,306,786 B1 | 10/2001 | Koyama et al. |
| 6,314,760 B1 | 11/2001 | Chenoweth |
| 6,329,310 B1 | 12/2001 | Peuchert et al. |
| 6,358,873 B1 | 3/2002 | Stewart |
| 6,376,403 B1 | 4/2002 | Koyama et al. |
| 6,399,527 B1 | 6/2002 | Kishimoto et al. |
| 6,403,676 B1 | 6/2002 | Jia et al. |
| 6,422,041 B1 | 7/2002 | Simpson et al. |
| 6,451,720 B1 | 9/2002 | Kishimoto |
| 6,457,943 B1 | 10/2002 | Olsen et al. |
| 6,458,436 B1 | 10/2002 | Hansen et al. |
| 6,468,428 B1 | 10/2002 | Nishii et al. |
| 6,496,706 B1 | 12/2002 | Jon et al. |
| 6,540,508 B1 | 4/2003 | Simpson et al. |
| 6,579,599 B1 | 6/2003 | Blum et al. |
| 6,686,304 B1 | 2/2004 | Wallenberger |
| 6,794,322 B2 | 9/2004 | Sircar |
| 6,809,050 B1 | 10/2004 | McGinnis |
| 6,818,575 B2 | 11/2004 | Wallenberger |
| 6,867,158 B2 | 3/2005 | Peuchert |
| 6,933,045 B2 | 8/2005 | Tamura |
| 6,933,252 B2 | 8/2005 | Pierce |
| 6,998,361 B2 | 2/2006 | Lewis |
| 7,022,634 B2 | 4/2006 | Hamilton et al. |
| 7,189,671 B1 | 3/2007 | Lewis |
| 7,259,118 B2 | 8/2007 | Jubb et al. |
| 7,285,510 B2 | 10/2007 | Sakaguchi et al. |
| 7,449,419 B2 | 11/2008 | Li |
| 7,509,819 B2 | 3/2009 | Baker et al. |
| 7,781,355 B2 | 8/2010 | Berthereau et al. |
| 7,799,713 B2 | 9/2010 | Hofmann et al. |
| 7,811,954 B2 | 10/2010 | Berthereau et al. |
| 7,823,417 B2 | 11/2010 | Hofmann et al. |
| 2001/0011058 A1 | 8/2001 | Tamura |
| 2002/0000101 A1 | 1/2002 | Chenoweth |
| 2002/0045528 A1 | 4/2002 | Kusuno et al. |
| 2003/0018855 A1 | 1/2003 | McWilliams et al. |
| 2003/0077178 A1 | 4/2003 | Stearns |
| 2003/0100431 A1 | 5/2003 | Koyo et al. |
| 2003/0166446 A1 | 9/2003 | Lewis |
| 2003/0188554 A1 | 10/2003 | Baker et al. |
| 2003/0207748 A1 | 11/2003 | Wallenberger |
| 2003/0224922 A1 | 12/2003 | Wallenberger |
| 2004/0092379 A1* | 5/2004 | Lewis ............................. 501/70 |
| 2004/0220038 A1 | 11/2004 | Wolff |
| 2005/0009683 A1 | 1/2005 | Hamilton et al. |
| 2005/0014624 A1 | 1/2005 | Jubb et al. |
| 2005/0031703 A1 | 2/2005 | Beier et al. |
| 2005/0084440 A1 | 4/2005 | Chacon et al. |
| 2005/0085369 A1 | 4/2005 | Jesen |
| 2005/0090377 A1 | 4/2005 | Shelestak et al. |
| 2005/0107238 A1 | 5/2005 | Li |
| 2005/0130825 A1 | 6/2005 | Kravchenko et al. |
| 2005/0232828 A1 | 10/2005 | Merry |
| 2005/0234216 A1 | 10/2005 | Klein et al. |
| 2006/0001005 A1 | 1/2006 | Kishimoto et al. |
| 2006/0003884 A1 | 1/2006 | Nishizawa et al. |
| 2006/0257240 A1 | 11/2006 | Naskali et al. |
| 2007/0087139 A1 | 4/2007 | Creux et al. |
| 2007/0105701 A1 | 5/2007 | Hoffmann et al. |
| 2007/0107220 A1 | 5/2007 | Bakhuis et al. |
| 2008/0009403 A1 | 1/2008 | Hofmann et al. |
| 2008/0053152 A1 | 3/2008 | Kurachi et al. |
| 2008/0141721 A1 | 6/2008 | Adams et al. |
| 2009/0286440 A1 | 11/2009 | Lecomte et al. |
| 2010/0093511 A1 | 4/2010 | Berthereau et al. |
| 2010/0160139 A1 | 6/2010 | McGinnis |
| 2010/0160140 A1 | 6/2010 | McGinnis |
| 2010/0162772 A1 | 7/2010 | McGinnis |
| 2010/0184345 A1 | 7/2010 | Lalande et al. |

(56) References Cited

U.S. PATENT DOCUMENTS

| | | | |
|---|---|---|---|
| 2011/0000263 A1 | 1/2011 | Hofmann | |
| 2011/0003678 A1 | 1/2011 | Hofmann | |
| 2011/0039681 A1 | 2/2011 | Lecomte et al. | |

FOREIGN PATENT DOCUMENTS

| | | |
|---|---|---|
| CN | 1243501 | 2/2000 |
| CN | 1392870 | 1/2003 |
| CN | 1678654 | 10/2005 |
| CN | 101580344 | 11/2009 |
| CN | 101597140 | 12/2009 |
| CN | 101691278 | 4/2010 |
| CN | 101838110 | 9/2010 |
| CN | 101549958 | 1/2011 |
| DE | 1496520 | 8/1969 |
| EP | 500325 | 8/1992 |
| EP | 931774 | 7/1999 |
| FR | 1357393 | 4/1964 |
| FR | 1435073 | 4/1966 |
| FR | 1534135 | 12/1968 |
| FR | 1589410 | 3/1970 |
| FR | 2223328 | 10/1974 |
| FR | 2692248 | 12/1993 |
| FR | 2856055 | 12/2004 |
| FR | 2879591 | 6/2006 |
| FR | 2916438 | 11/2008 |
| GB | 428 720 A | 5/1935 |
| GB | 1006524 | 10/1965 |
| GB | 1147718 | 4/1969 |
| GB | 1209244 | 10/1970 |
| GB | 1531287 | 11/1978 |
| JP | 45-011228 | 5/1970 |
| JP | 48-024411 | 7/1973 |
| JP | 51-055308 | 5/1976 |
| JP | 58 064243 A | 4/1983 |
| JP | 58-088138 | 5/1983 |
| JP | 1-189985 | 7/1989 |
| JP | 1-239039 | 9/1989 |
| JP | 3-112650 | 5/1991 |
| JP | 4-050144 | 2/1992 |
| JP | 6-211543 | 8/1994 |
| JP | 6-219780 | 8/1994 |
| JP | 6-305773 | 11/1994 |
| JP | 7-010598 | 1/1995 |
| JP | 8-231240 | 9/1996 |
| JP | 2582361 | 2/1997 |
| JP | 09-078461 | 3/1997 |
| JP | 11-021147 | 1/1999 |
| JP | 1997-176694 | 1/1999 |
| JP | 2000-247677 | 9/2000 |
| JP | 2000-247683 | 9/2000 |
| JP | 2001-206733 | 7/2001 |
| JP | 2001-316961 | 11/2001 |
| JP | 2002-003237 | 1/2002 |
| JP | 2002-060252 | 2/2002 |
| JP | 2002-069941 | 3/2002 |
| JP | 2002-081022 | 3/2002 |
| JP | 2002-154843 | 5/2002 |
| JP | 2002-293574 | 10/2002 |
| JP | 2003-137590 | 5/2003 |
| JP | 2003-160350 | 6/2003 |
| JP | 2003-171143 | 6/2003 |
| JP | 2003-183031 | 7/2003 |
| JP | 2003-238947 | 8/2003 |
| JP | 2003-239847 | 8/2003 |
| JP | 2003-321247 | 11/2003 |
| JP | 2004-091307 | 3/2004 |
| WO | 99/31021 | 6/1999 |
| WO | 00/15526 | 3/2000 |
| WO | 02/20419 | 3/2002 |
| WO | 02/85315 | 4/2002 |
| WO | 02/42233 | 5/2002 |
| WO | 2004/020506 | 3/2004 |
| WO | 2004/094794 | 11/2004 |
| WO | 2005/092808 | 10/2005 |
| WO | 2005/093227 | 10/2005 |
| WO | 2006/064164 | 6/2006 |
| WO | 2007/055964 | 5/2007 |
| WO | 2007/055968 | 5/2007 |
| WO | 2008/073585 | 6/2008 |
| WO | 2010/075258 | 7/2010 |
| WO | 2010/075262 | 7/2010 |
| WO | 2010/075267 | 7/2010 |

OTHER PUBLICATIONS

Office action from U.S. Appl. No. 11/722,039 dated Mar. 1, 2010.
Office action from Brazilian Application No. PI01149733 dated Mar. 10, 2009.
Office action from Canadian Application No. 2,528,923 dated Dec. 9, 2010 along with English translation of relevant portions of action.
Office action from Canadian Application No. 2,528,923 dated Jul. 12, 2011.
Office action from Chinese Application No. 200480015986.4 dated Jul. 6, 2007.
Office action from Chinese Application No. 200580043075.7 dated Feb. 5, 2010.
Office action from Chinese Application No. 200680041114.4 dated Feb. 29, 2012.
Office action from European Application No. 04767297.7 dated Sep. 8, 2006.
Search Report from French Registration No. 635569 (FR 0306981) dated Feb. 13, 2004.
Search Report from French Registration No. 658923 (FR 0413443) dated Aug. 16, 2005.
Office action from Indian Application No. 00501/KOLNP/2003 dated Jul. 7, 2006.
Office action from Indian Application No. 00501/KOLNP/2003 dated May 14, 2007.
Office action from Indian Application No. 2546/KOLNP/2005 dated Jun. 15, 2007.
Office action from Japanese Application No. 2002-544374 dated Sep. 28, 2007.
Office action from Japanese Application No. 2002-544374 dated Jul. 27, 2009.
Office action from Japanese Application No. 2002-544374 dated Jul. 12, 2010.
Office action from Japanese Application No. 2006-516274 dated Jun. 22, 2010.
Office action from Japanese Application No. 2006-516274 dated Feb. 22, 2011.
Office action from Korean Application No. 10-2005-7023679 dated Mar. 3, 2011.
Office action from Mexican Application No. PA/a/2002/000814 dated Feb. 22, 2006.
Office action from Mexican Application No. PA/a/2002/00814 dated Sep. 9, 2005.
Office action from Mexican Application No. PA/a/2002/00814 dated Jun. 23, 2005.
Office action from Mexican Application No. PA/a/2002/00814 dated Sep. 26, 2002.
Office action from Mexican Application No. 05/013323 dated Feb. 27, 2006.
Office action from Mexican Application No. 05/013323 dated May 29, 2009.
Office action from Mexican Application No. 07/06989 dated Aug. 22, 2007.
Office action from Russian Application No. 2007126843 dated Sep. 24, 2009.
Office action from Russian Application No. 2007126843 dated Dec. 11, 2009.
Office action from Canadian Application No. 2,426,637 dated Aug. 28, 2008.
Office action from Russian Application No. 2006100296/03 dated Jun. 8, 2008.
Office action from Russian Application No. 2006100296/03 dated Nov. 26, 2008.
Office action from U.S. Appl. No. 09/703,234 dated Apr. 15, 2002.

(56) References Cited

OTHER PUBLICATIONS

Office action from U.S. Appl. No. 09/703,234 dated Sep. 6, 2002.
Advisory action from U.S. Appl. No. 09/703,234 dated Nov. 19, 2002.
Office action from U.S. Appl. No. 09/703,234 dated Feb. 4, 2003.
Office action from U.S. Appl. No. 09/703,234 dated Jul. 11, 2003.
Advisory action from U.S. Appl. No. 09/703,234 dated Oct. 24, 2003.
Office action from U.S. Appl. No. 09/703,234 dated Dec. 16, 2003.
Notice of Allowance from U.S. Appl. No. 09/703,234 dated Jul. 6, 2004.
Office action from U.S. Appl. No. 10/560,068 dated Aug. 1, 2008.
Office action from U.S. Appl. No. 10/560,068 dated Dec. 15, 2008.
Advisory Action from U.S. Appl. No. 10/560,068 dated Feb. 25, 2009.
Office action from U.S. Appl. No. 10/560,068 dated May 7, 2009.
Office action from U.S. Appl. No. 10/560,068 dated Nov. 5, 2009.
Advisory Action from U.S. Appl. No. 10/560,068 dated Mar. 16, 2010.
Panel Decision of Pre-Appeal Brief from U.S. Appl. No. 10/560,068 dated Apr. 29, 2010.
Examiner's Answer from U.S. Appl. No. 10/560,068 dated Aug. 3, 2010.
Office action from U.S. Appl. No. 11/267,702 dated Dec. 23, 2008.
Notice of Allowance from U.S. Appl. No. 11/267,702 dated Jul. 29, 2009.
Office action from U.S. Appl. No. 11/267,702 dated Dec. 3, 2009.
Notice of Allowance from U.S. Appl. No. 11/267,702 dated Jun. 16, 2010.
Office action from U.S. Appl. No. 11/267,739 dated Dec. 18, 2008.
Notice of Allowance from U.S. Appl. No. 11/267,739 dated Jul. 13, 2009.
Office action from U.S. Appl. No. 11/267,739 dated Dec. 3, 2009.
Notice of Allowance from U.S. Appl. No. 11/267,739 dated Apr. 7, 2010.
Office action from U.S. Appl. No. 11/722,039 dated Oct. 28, 2009.
Office action from U.S. Appl. No. 11/722,039 dated Jun. 22, 2010.
Interview Summary from U.S. Appl. No. 11/722,039 dated Sep. 21, 2010.
Office action from U.S. Appl. No. 11/722,039 dated Oct. 19, 2010.
Office action from U.S. Appl. No. 11/722,039 dated Jun. 7, 2011.
Office action from U.S. Appl. No. 12/341,985 dated Nov. 17, 2010.
Office action from U.S. Appl. No. 12/341,985 dated Apr. 21, 2011.
Notice of Allowance from U.S. Appl. No. 12/341,985 dated Oct. 12, 2011.
Office action from U.S. Appl. No. 12/344,130 dated Nov. 17, 2010.
Office action from U.S. Appl. No. 12/344,130 dated Apr. 20, 2011.
Notice of Allowance from U.S. Appl. No. 12/344,130 dated Oct. 11, 2011.
Office action from U.S. Appl. No. 12/847,206 dated Feb. 22, 2011.
Office action from U.S. Appl. No. 12/847,206 dated Oct. 14, 2011.
Office action from U.S. Appl. No. 12/880,289 dated Jul. 20, 2011.
Notice of Allowance from U.S. Appl. No. 12/880,289 dated Dec. 22, 2011.
International Search Report from PCT/FR04/01431 dated Jun. 11, 2003.
International Search Report from PCT/FR05/51090 date Mar. 23, 2006.
International Search Report and Written Opinion from PCT/US06/42406 dated May 8, 2007.
International Search Report and Written Opinion from PCT/US06/42437 dated Apr. 30, 2007.
International Search Report and Written Opinion from PCT/US09/68949 dated May 7, 2010.
International Search Report and Written Opinion from PCT/US09/68955 dated May 7, 2010.
International Search Report and Written Opinion from PCT/US09/68965 dated May 7, 2010.
Office action from Australian Application No. 2006312015 dated May 5, 2011.
Office action from Australian Application No. 2006312106 dated May 5, 2011.
Office action from Chinese Application No. 200580043075.7 dated Dec. 7, 2011.
Office action from Chinese Application No. 200680041104.0 dated Aug. 4, 2010.
Office action from Chinese Application No. 200680041104.0 dated Mar. 22, 2011.
Office action from Chinese Application No. 200680041104.0 dated Jul. 14, 2011.
Office action from European Application No. 01987549.1 dated Aug. 5, 2011.
Office action from European Application No. 05825565.4 dated Dec. 14, 2007.
Office action from European Application No. 05825565.4 dated Nov. 19, 2010.
Office action from European Application No. 05825565.4 dated May 9, 2011.
Office action from European Application No. 05825565.4 dated Mar. 31, 2011.
Communication from EP application No. 06827125.3 dated Jun. 4, 2009 which includes the EP OA from Feb. 13, 2009 and the Search Report dated Dec. 10, 2008.
Office action from Indian Application No. 2108/KOLNP/2007 dated Jun. 28, 2011.
Office action from Japanese Application No. 2007-546144 dated Sep. 13, 2011.
Office action from Korean Application No. 2003-7005873 dated Jun. 26, 2007.
Office action from Korean Application No. 2003-7005873 dated Nov. 29, 2007.
Office action from Mexican Application No. 07/006989 dated Oct. 24, 2011.
Communication regarding Mexican Application No. 08/05816 dated Mar. 15, 2011.
Office action from Mexican Application No. 08/005819 dated Mar. 16, 2011.
Office action from Mexican Application No. 08/005819 dated Jun. 3, 2011.
Office action from Russian Application No. 2008117091 dated Apr. 19, 2010.
Office action from Russian Application No. 2008117091 dated Dec. 13, 2010.
Office action from Russian Application No. 2008117092 dated Oct. 12, 2011.
Aslanova, "Steklyannye volokna", Glass Fibers, Moscow, Khimiya, 1979, I, 256 pp. pp. 33, 34, Fig. 3.2).
Chernyak et alo. "Nepreryvnoe steklyannoe volokno" Continuous Glass Fiber, Moscow, Khimiya, 1965.
Fredell, "Fiber metal laminates for improved structural integrity", 1992, conference paper.
Joosee, "Literature search of mechanical properties of fiber-reinforced plastics for wind turbine rotors", Dec. 1988 English abstract included.
Popov, et al., "Proizvodstvo i primenenie plavlenolitykh ogneuporov", Manufacture and Application of Molen Cast Refractory Materials, Moscow, Metallurgiya, 1985, IV, p. 212-213.
Office action from U.S. Appl. No. 11/699,719 dated Jan. 22, 2013.
Office action from Chinese Application No. 200680041104.0 dated Jan. 14, 2013.
Office action from U.S. Appl. No. 12/643,411 dated Jan. 28, 2013.
Office action from Mexican Application No. 11/06712 dated Feb. 1, 2013 along with English translation of relevant portions of action.
Office action from Taiwanese Serial No. 094144552 dated May 7, 2012.
Notice of Allowance from U.S. Appl. No. 12/344,130 dated Jun. 7, 2012.
Notice of Allowance from U.S. Appl. No. 12/341,985 dated Jun. 11, 2012.
Office action from Russian Application No. 2008117092/03 dated Apr. 26, 2012.
Office action from Chinese Application No. 200680041114.4 dated Mar. 25, 2013.

(56) References Cited

OTHER PUBLICATIONS

Office action from Korean Application No. 10-2007-7016026 dated Feb. 25, 2013.
Notice of Allowance from U.S. Appl. No. 12/847,206 dated Apr. 8, 2013.
Office action from Chinese Application No. 200680041104.0 dated Jun. 13, 2012.
English Translation of JP Patent No. 2002-154843. Copy of foreign patent along with English abstract previously submitted.
Office action from Canadian Application No. 2,591,026 dated May 15, 2012 along with English translation of relevant portions of Action.
Office action from U.S. Appl. No. 11/699,719 dated Jul. 2, 2012.
Office action from Mexican Application No. 07/06989 dated Jun. 26, 2012.
Notice of Allowance from U.S. Appl. No. 12/847,206 dated Jul. 5, 2013.
Examiner's Answer from U.S. Appl. No. 11/722,039 dated Jul. 26, 2013.
Office action from Chinese Application No. 200680041114.4 dated Jul. 1, 2013.
Office action from Mexican Application No. 07/006989 dated Jun. 19, 2013.
Notice of Allowance from U.S. Appl. No. 11/699,719 dated Jul. 11, 2013.
Office action from Canadian Application No. 2,626,732 dated Jun. 13, 2013.
Office action from Canadian Application No. 2,626,733 dated Jun. 27, 2013.
Office action from Japanese Application No. 2008-540053 dated Jul. 30, 2012.
Office action from Japanese Application No. 2008-540052 dated Jul. 30, 2012.
Office action from Korean Application No. 10-2007-7016026 dated Aug. 9, 2012.
Office action from U.S. Appl. No. 12/643,411 dated Aug. 17, 2012.
Office action from U.S. Appl. No. 11/722,039 dated Aug. 24, 2012.
Lund, "Tensile strength of glass fibres", dated Feb. 18, 2010.
Appeal Decision from U.S. Appl. No. 10/560,068 dated Aug. 15, 2012.
Office action from Canadian Application No. 2,626,733 dated Oct. 9, 2012.
Office action from European Application No. 09796243.5 dated Oct. 2, 2012.
Office action from Korean Application No. 2008-7010726 dated Nov. 14, 2012.
Office action from Korean Application No. 2008-7010727 dated Nov. 14, 2012.
Office action from Chinese Application No. 200680041114.4 dated Oct. 24, 2012.
Office action from European Application No. 09796559.4 dated Dec. 19, 2012.
Office action from Indian Application No. 1733/KOLNP/2008 dated Dec. 6, 2012.
Office action and Search Report from Taiwanese Application No. 95139183 dated Nov. 5, 2012 along with English translation of relevant portions of action.
Office action and Search Report from Taiwanese Application No. 95139185 dated Oct. 24, 2012 along with English translation of relevant portions of action.
Notice of Allowance from U.S. Appl. No. 12/880,289 dated Aug. 31, 2012.
Office action from Chinese Application No. 200680041104.0 dated Sep. 13, 2012.
Office action from Japanese Application No. 2009-533917 dated Sep. 24, 2012.
Notice of Allowance from U.S. Appl. No. 12/341,985 dated Oct. 11, 2012.
Office action from Brazilian Application No. PI0411336-5 dated Apr. 5, 2013.
Office action from Canadian Application No. 2,591,026 dated Mar. 25, 2013.
Office action from Chinese Application No. 200980156454.5 dated Apr. 11, 2013.
Office action from Chinese Application No. 200980156910.6 dated Apr. 16, 2013.
Refusal Decision from Russian Application No. 2008117092/03 dated Mar. 15, 2013.
Notice of Allowance from U.S. Appl. No. 11/699,719 dated May 7, 2013.
Notice of Allowance from U.S. Appl. No. 12/989,225 dated Mar. 11, 2013.
Office action from U.S. Appl. No. 12/989,225 dated Nov. 19, 2012.
Office action from Saudi Arabian Application No. 1093000629 dated Jun. 5, 2013 along with English translation of relevant portions of action.
Office action from Indian Application No. 1732/KOLNP/2008 dated Mar. 16, 2013 received on May 25, 2013.
Office action from Chinese Application No. 200580043075.7 dated May 2, 2013.
Office action from U.S. Appl. No. 10/560,068 dated Oct. 10, 2013.
Office action from Japanese Application No. 2011-542538 dated Oct. 28, 2013.
Office action from Chinese Application No. 200980156910.6 dated Oct. 21, 2013.
Office action from Japanese Application No. 2008-540052 dated Oct. 21, 2013.
Office action from Japanese Application No. 2008-540053 dated Oct. 21, 2013.
Office action from Saudi Arabian Application No. 109310016 dated Aug. 25, 2013 received on Dec. 8, 2013.
Office action from Russian Application No. 2011126895 dated Nov. 18, 2013 along with English translation of relevant portions of action.
Office action from Russian Application No. 2011126891 dated Nov. 1, 2013.
Office action from U.S. Appl. No. 10/560,068 dated Apr. 15, 2014.
Office action from Canadian Application No. 2,626,733 dated Mar. 5, 2014.
Reexamination Decision from Chinese Application No. 200580043075.7 dated Feb. 8, 2014.
Office action from Chinese Application No. 200980156454.5 dated Mar. 21, 2014.
Office action from Russian Application No. 2010133664/03 dated Apr. 14, 2014, 11 pgs.
Office action from Australian Application No. 2009330199 dated Aug. 13, 2014.
Office action from Australian Application No. 2009330204 dated Aug. 16, 2014.
Office action from Chinese Application No. 200680041104.0 dated Jul. 23, 2014.
Office action from Japanese Application No. 2008-540053 dated Jul. 26, 2014.
Advisory Action from U.S. Appl. No. 10/560,068 dated Jul. 22, 2014.
Office Communication from European Application No. 06827125.3 dated Aug. 18, 2014.
Communication/Search Report from European Application No. 06827148.5 dated Apr. 23, 2014.
Office action from Chinese Application No. 200980156910.6 dated Apr. 30, 2014.
Office action from Turkish Application No. 2011/06170 dated Mar. 18, 2014.
Office action from U.S. Appl. No. 13/927,271 dated Jul. 9, 2014.
Office action from Indian Application No. 1733/KOLNP/2008 dated Jun. 19, 2014.
Office action from Taiwanese Application No. 98143905 dated Jun. 9, 2014 along with English translation of relevant portions of action.
Office action from Taiwanese Application No. 98143904 dated Jun. 9, 2014 along with English translation of relevant portions of action.
Office action from Japanese Application No. 2011-542542 dated Jan. 15, 2014.
Interview Summary from U.S. Appl. No. 10/560,068 dated Jan. 29, 2014.

(56) References Cited

OTHER PUBLICATIONS

Office action from Canadian Application No. 2,591,026 dated Jan. 24, 2014.
Office action from Chinese Application No. 200980156454.5 dated Dec. 26, 2013.
Interview Summary from U.S. Appl. No. 10/560,068 dated Jul. 22, 2014.
Japanese Office action from U.S. Appl. No. 2008-540053 dated Jul. 26, 2013.
Chinese Office action from U.S. Appl. No. 200680041104.0 dated Jul. 23, 2014.
Office action from U.S. Appl. No. 13/927,271 dated Nov. 14, 2014.
Office action from Chinese Application No. 200680041114.4 dated Nov. 18, 2014.
Examination Report from Turkish Application No. 2011/06169 dated Aug. 29, 2014, received on Nov. 26, 2014.
Office action from Chinese Application No. 200980156454.5 dated Dec. 12, 2014.
Office action from Mexican Application No. 11/06711 dated Aug. 21, 2014 along with English translation of relevant portions of action.
Office action from U.S. Appl. No. 14/643,411 dated Feb. 20, 2015.
Office action from Chinese Application No. 200680041104.0 dated Feb. 16, 2015.
Office action from Mexican Application No. 11/06711 dated Jan. 25, 2015 along with English translation of relevant portions of action.
Office action from Chinese Application No. 200680041114.4 dated May 28, 2015 along with English translation of relevant portions of action.
Office action from Canadian Application No. 2,747,993 dated Jun. 3, 2015.
Office action from Mexican Patent Application No. 11/06711 dated Apr. 17, 2015 received on Jun. 19, 2015 along with English translation of relevant portions of action.
Office action from Chinese Application No. 200980156454.5 dated May 22, 2015.
Office action from U.S. Appl. No. 10/560,068 dated Jun. 15, 2015.
Notice of Allowance from U.S. Appl. No. 13/927,271 dated Jul. 7, 2015.
Office action from U.S. Appl. No. 12/643,411 dated Aug. 12, 2015.
English language Machine Translation of Sugano (JP 2002-154843) accessed at PAJ.

\* cited by examiner

METHOD OF MANUFACTURING S-GLASS FIBERS IN A DIRECT MELT OPERATION AND PRODUCTS FORMED THERE FROM

CROSS REFERENCE TO RELATED APPLICATIONS

This application is a Continuation-in-Part of U.S. patent application Ser. No. 12/341,985 entitled "Composition for High Performance Glass Fibers and Fibers Formed Therewith" filed Dec. 22, 2008, the entire content of which is expressly incorporated herein by reference. This application is also a Continuation-in-Part of U.S. patent application Ser. No. 11/267,702 entitled "Method of Manufacturing High Performance Glass Fibers in a Refractory Lined Melter and Fibers Formed Thereby" filed Nov. 4, 2005, the entire content of which is also expressly incorporated herein by reference. This application is also a Continuation-in-Part of U.S. patent application Ser. No. 11/267,739 entitled "Composition for High Performance Glass, High Performance Glass Fibers and Articles Therefrom" filed Nov. 4, 2005, the entire content of which is also expressly incorporated herein by reference.

TECHNICAL FIELD AND INDUSTRIAL

Applicability of the Invention

The present invention is generally directed to a method of manufacturing continuous glass fibers for use in high-strength applications and products made there from, such as ballistic armor, pressure vessels, structural aerospace materials, structural marine materials, and structural materials for wind energy such as windmill masts and blades.

BACKGROUND OF THE INVENTION

Fiberglass reinforced composite materials have been available for use in marine and aerospace materials for some time. Other fiber materials such as carbon and aramid fibers are available for use, although at substantially higher cost. The articles of the present invention may use any known manufacturing method, including compression molding, laminating, spray up, hand laying, prefabricated lay-up (prepreg), compression molding, vacuum bag molding, pressure bag molding, press molding, transfer molding, vacuum assisted resin transfer molding, pultrusion molding, filament winding, casting, autoclave molding, centrifugal casting resin transfer and continuous casting. The properties of the composite are controlled by the fibers and the resin, and synergy between the two, that produces material properties unavailable from the individual materials.

A number of resins are useful in the manufacture of composite articles including polyester resin, vinylester resin and epoxy resin. Polyester resin is suitable for a number of situations. Vinylester resin has lower viscosity pressure and more flexible postcure than polyester resin and is typically more resistant to degradation. Epoxy resin is typically transparent when cured. Epoxy resin is a polyether resin formed by the polymerization bisphenol A, bisphenol F, bisphenol C, and compounds of similar structure with epichlorohydrin resulting in the formation of the reactive oxirane linkage. Epoxy resins may react with a variety of curing agents, including amines, anhydrides, mercaptans, polyesters to form an infusable solid. The reaction is a condensation reaction typically does not create by-products. Cured epoxy resins have high strength, and low shrinkage during curing. They are used as coatings, adhesives, castings, composites, or foam. Epoxy resins are also desirable for use in high strength applications as a structural matrix material or as a structural glue. Phenolics are thermosetting resins formed by the condensation of phenol, or of a phenol derivative, with an aldehyde, typically a formaldehyde. Phenolics are used chiefly in the manufacture of paints and plastics. Other specific high strength modulus resins include bismaleimide, poly-amide, vinyl ester phenolic, ethylene-acrylate or methacrylate copolymers, high strength medium modulus thermoplastics such as an ionomer (i.e. crosslinked ethylene-methyl acrylate or methyl methacrylate copolymer), polycarbonate, polyurethane, nylon, aramid, modified epoxies.

The most common high strength glass composition for making continuous glass fiber strands is "S-Glass." S-Glass is a family of glasses composed primarily of the oxides of magnesium, aluminum, and silicon with a chemical composition that produces glass fibers having a higher mechanical strength than E-Glass fibers. A commonly used member of the S-Glass family is known as S2-Glass. S2-Glass includes approximately 65 weight % $SiO_2$, 25 weight % $Al_2O_3$, and 10 weight % MgO. S-glass has a composition that was originally designed to be used in high-strength applications such as ballistic armor.

R-Glass is a family of glasses that are composed primarily of the oxides of silicon, aluminum, magnesium, and calcium with a chemical composition that produces glass fibers with a higher mechanical strength than E-Glass fibers. R-Glass has a composition that contains approximately 58-60 weight % $SiO_2$, 23.5-25.5 weight % $Al_2O_3$, 14-17 weight % CaO plus MgO, 0% $B_2O_3$, 0% $F_2$ and less than 2 weight % miscellaneous components. R-Glass contains more alumina and silica than E-Glass and requires higher melting and processing temperatures during fiber forming. Typically, the melting and processing temperatures for R-Glass are at least 160° C. higher than those for E-Glass. This increase in processing temperature typically requires the use of a high-cost platinum-lined melter. In addition, the close proximity of the liquidus temperature to the forming temperature in R-Glass requires that the glass be fiberized at a higher temperature than E-Glass.

Tables IA-IE set forth the compositions for a number of conventional high-strength glass compositions.

TABLE I-A

| Constituent | Chinese High Strength glass | RUSSIAN CONTINUOUS ROVING MAGNESIUM ALUMINOSILICATE | NITTOBO "T" Glass Fabric "B" | NITTOBO "T" Glass Fabric (Yarn) "C" |
|---|---|---|---|---|
| $SiO_2$ | 55.08 | 55.81 | 64.58 | 64.64 |
| CaO | 0.33 | 0.38 | 0.44 | 0.40 |
| $Al_2O_3$ | 25.22 | 23.78 | 24.44 | 24.57 |
| $B_2O_3$ | 1.85 | | 0.03 | 0.03 |
| MgO | 15.96 | 15.08 | 9.95 | 9.92 |
| $Na_2O$ | 0.12 | 0.063 | 0.08 | 0.09 |

TABLE I-A-continued

| Constituent | Chinese High Strength glass | RUSSIAN CONTINUOUS ROVING MAGNESIUM ALUMINOSILICATE | NITTOBO "T" Glass Fabric "B" | NITTOBO "T" Glass Fabric (Yarn) "C" |
|---|---|---|---|---|
| Fluorine | 0.03 | | 0.034 | 0.037 |
| $TiO_2$ | 0.023 | 2.33 | 0.019 | 0.018 |
| $Fe_2O_3$ | 1.1 | 0.388 | 0.187 | 0.180 |
| $K_2O$ | 0.039 | 0.56 | 0.007 | 0.010 |
| $ZrO_2$ | 0.007 | 0.15 | | |
| $Cr_2O_3$ | | 0.011 | 0.003 | 0.003 |
| $Li_2O$ | | 1.63 | | |
| $CeO_2$ | | | | |

TABLE I-B

| Constituent | Nitto Boseki A&P Yarn | Nitto Boseki NT6030 Yarn | Nitto Boseki TE Glass RST-220PA-535CS | Vetrotex Saint Gobain SR Glass Stratifils SR CG 250 P109 | Polotsk STEKLOVOLOKNO High Strength Glass |
|---|---|---|---|---|---|
| $SiO_2$ | 65.51 | 64.60 | 64.20 | 63.90 | 58.64 |
| CaO | 0.44 | 0.58 | 0.63 | 0.26 | 0.61 |
| $Al_2O_3$ | 24.06 | 24.60 | 25.10 | 24.40 | 25.41 |
| $B_2O_3$ | | | | | 0.04 |
| MgO | 9.73 | 9.90 | 9.90 | 10.00 | 14.18 |
| $Na_2O$ | 0.04 | 0.06 | 0.020 | 0.039 | 0.05 |
| Fluorine | 0.07 | | | | 0.02 |
| $TiO_2$ | 0.016 | 0.000 | 0.000 | 0.210 | 0.624 |
| $Fe_2O_3$ | 0.067 | 0.079 | 0.083 | 0.520 | 0.253 |
| $K_2O$ | 0.020 | 0.020 | 0.020 | 0.540 | 0.35 |
| $ZrO_2$ | 0.079 | | | | |
| $Cr_2O_3$ | 0.0010 | | | 0.001 | 0.023 |
| $Li_2O$ | | | | | |
| $CeO_2$ | | | | | |

TABLE I-C

| Constituent | Chinese High Strength Yarn (8 micron) | Chinese High Strength Glass Roving | Zentron S-2 Glass Roving | SOLAIS Glass Sample | Advanced Glass Yarns R Glass |
|---|---|---|---|---|---|
| $SiO_2$ | 55.22 | 55.49 | 64.74 | 64.81 | 58.46 |
| CaO | 0.73 | 0.29 | 0.14 | 0.55 | 9.39 |
| $Al_2O_3$ | 24.42 | 24.88 | 24.70 | 24.51 | 24.55 |
| $B_2O_3$ | 3.46 | 3.52 | | 0.02 | 0.04 |
| MgO | 12.46 | 12.28 | 10.24 | 9.35 | 5.91 |
| $Na_2O$ | 0.104 | 0.06 | 0.17 | 0.16 | 0.079 |
| Fluorine | 0.07 | | | 0.02 | 0.054 |
| $TiO_2$ | 0.32 | 0.36 | 0.015 | 0.04 | 0.196 |
| $Fe_2O_3$ | 0.980 | 0.930 | 0.045 | 0.238 | 0.400 |
| $K_2O$ | 0.240 | 0.150 | 0.005 | 0.03 | 0.67 |
| $ZrO_2$ | | | | | |
| $Cr_2O_3$ | 0.0050 | | | 0.007 | 0.005 |
| $Li_2O$ | 0.59 | 0.63 | | | |
| $CeO_2$ | 1.23 | 1.25 | | | |

TABLE I-D

| Constituent | Advanced Glass Yarns S Glass | Culimeta Roving | IVG Vertex B96 675 Yarn | IVG Vertex Glass Roving | IVG Vertex Outside #1 Glass Roving |
|---|---|---|---|---|---|
| $SiO_2$ | 64.61 | 59.37 | 58.34 | 58.58 | 58.12 |
| CaO | 0.17 | 0.27 | 0.31 | 0.30 | 0.31 |
| $Al_2O_3$ | 24.84 | 25.49 | 23.81 | 24.26 | 24.09 |
| $B_2O_3$ | 0.04 | 0.05 | | | |
| MgO | 10.11 | 13.47 | 14.99 | 15.02 | 15.36 |
| $Na_2O$ | 0.118 | 0.024 | 0.05 | 0.02 | 0.03 |
| Fluorine | 0.03 | | 0.04 | 0.04 | 0.04 |
| $TiO_2$ | 0.011 | 0.530 | 1.380 | 0.67 | 0.91 |
| $Fe_2O_3$ | 0.042 | 0.374 | 0.333 | 0.336 | 0.303 |
| $K_2O$ | | 0.48 | 0.42 | 0.28 | 0.29 |

TABLE I-D-continued

| Constituent | Advanced Glass Yarns S Glass | Culimeta Roving | IVG Vertex B96 675 Yarn | IVG Vertex Glass Roving | IVG Vertex Outside #1 Glass Roving |
|---|---|---|---|---|---|
| $ZrO_2$ | | 0.152 | 0.129 | 0.165 | 0.157 |
| $Cr_2O_3$ | 0.0050 | 0.0120 | 0.0100 | 0.0120 | 0.0120 |
| $Li_2O$ | | | | | |
| $CeO_2$ | | | | | |

TABLE I-E

| Constituent | IVG Vertex Outside #2 Glass Roving | RH CG250 P109 Glass Fiber Strand |
|---|---|---|
| $SiO_2$ | 58.69 | 58.54 |
| CaO | 0.29 | 9.35 |
| $Al_2O_3$ | 24.3 | 25.39 |
| $B_2O_3$ | | |
| MgO | 15.06 | 6.15 |
| $Na_2O$ | 0.03 | 0.10 |
| Fluorine | 0.04 | 0.16 |
| $TiO_2$ | 0.64 | 0.008 |
| $Fe_2O_3$ | 0.331 | 0.069 |
| $K_2O$ | 0.36 | 0.14 |
| $ZrO_2$ | 0.187 | 0.006 |
| $Cr_2O_3$ | 0.0130 | |
| $Li_2O$ | | |
| $CeO_2$ | | |

Both R-Glass and S-Glass are produced by melting the constituents of the compositions in a platinum-lined melting container. The costs of forming R-Glass and S-Glass fibers are dramatically higher than E-Glass fibers due to the cost of producing the fibers in such melters. Thus, there is a need in the art for methods of forming glass compositions useful in the formation of high performance glass fibers from a direct-melt process in a refractory-lined furnace and products formed there from.

SUMMARY OF THE INVENTION

The invention, in part, is a method of manufacturing a glass composition for the formation of continuous glass fibers that are suitable for use in high-strength applications. The composition useful in the present invention may be inexpensively formed into glass fibers using low-cost, direct melting in refractory-lined furnaces due to the relatively low fiberizing temperature of the glass fibers. One composition useful in the present invention includes 64-75 weight % $SiO_2$, 16-24 weight % $Al_2O_3$, 8-12 weight % MgO and 0.25 to 3.0 weight % $R_2O$ where $R_2O$ is the sum of $Li_2O$ and $Na_2O$. In certain embodiments, the glass composition is composed of 64-70 weight % $SiO_2$, 17-22 weight % $Al_2O_3$, 9-12 weight % MgO and 1.75-3.0 weight % $R_2O$ where $R_2O$ is the sum of $Li_2O$ and $Na_2O$. In another embodiment, a glass composition useful in the present invention is composed of 64-70 weight % $SiO_2$, 17-22 weight % $Al_2O_3$, 9-12 weight % MgO and 1.75-3.0 weight % $Li_2O$. In certain embodiments, the composition does not contain more than about 5.0 weight % of compounds such as CaO, $P_2O_5$, ZnO, $ZrO_2$, SrO, BaO, $SO_3$, $F_2$, $B_2O_3$, $TiO_2$ and $Fe_2O_3$.

The composition preferably does not contain more than about 4 weight % of compounds or halogens such as ZnO, $SO_3$, Fluorine, $B_2O_3$, $TiO_2$, $ZrO_2$ and $Fe_2O_3$. The desired properties of the high performance composite fibers manufactured by the present invention include a fiberizing temperature of less than 2650° F. and a liquidus temperature that is preferably below the fiberizing temperature by at least 80° F., more preferably by at least about 120° F., and most preferably by at least about 150° F.

The present invention includes a process for producing refined glass from a raw glass batch in a refractory-lined glass melter. The process includes charging a raw glass batch to a melting zone of a glass melter, melting the raw glass batch within the melting zone and forming fibers from the melt. The present invention also includes fibers formed by such a method, and products made from such fibers.

The present invention also provides a structural part having improved structural properties with decreased costs and improved manufacturability. The direct melt formation of the continuous glass fibers uses low-cost melting in refractory-lined furnaces. The relatively low fiberizing temperature of the glass fibers used in the high-strength applications of the present invention allows improved fiber processing at decreased cost. The articles of the present invention are typically formed by compression molding, laminating, spray up, hand laying, prefabricated lay-up (prepreg), compression molding, vacuum bag molding, pressure bag molding, press molding, transfer molding, vacuum assisted resin transfer molding, pultrusion molding, filament winding, casting, autoclave molding, centrifugal casting resin transfer or continuous casting. The fibers used in the present invention are substantially less expensive to make and also have good strength and density properties. The density of the fibers used in the present invention range between 2.434-2.486 g/cc and have a measured modulus of 12.71-12.96 MPsi and a measured strength of 688-737 KPsi.

DETAILED DESCRIPTION AND PREFERRED

Embodiments of the Invention

Figure 1:
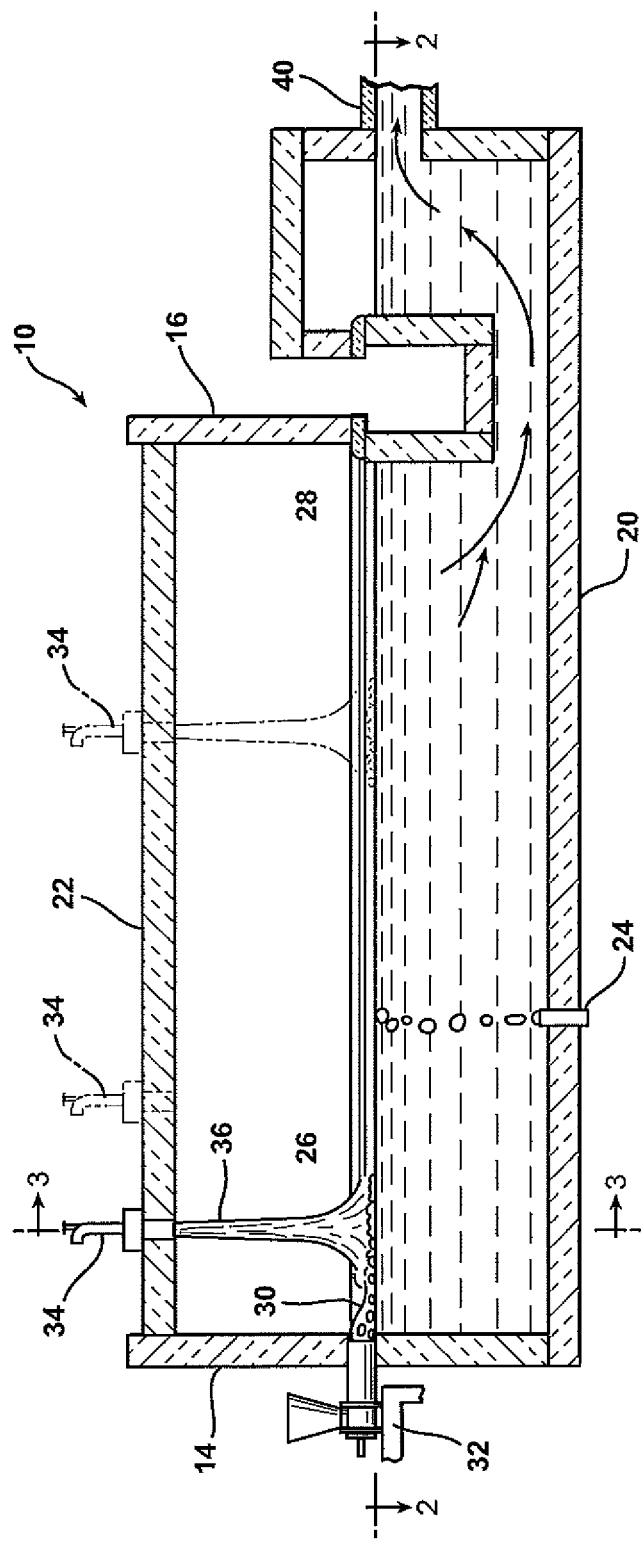
FIG. 1 is a cross-sectional longitudinal view of a glass melting furnace useful with the method of the present invention.
Figure 2:
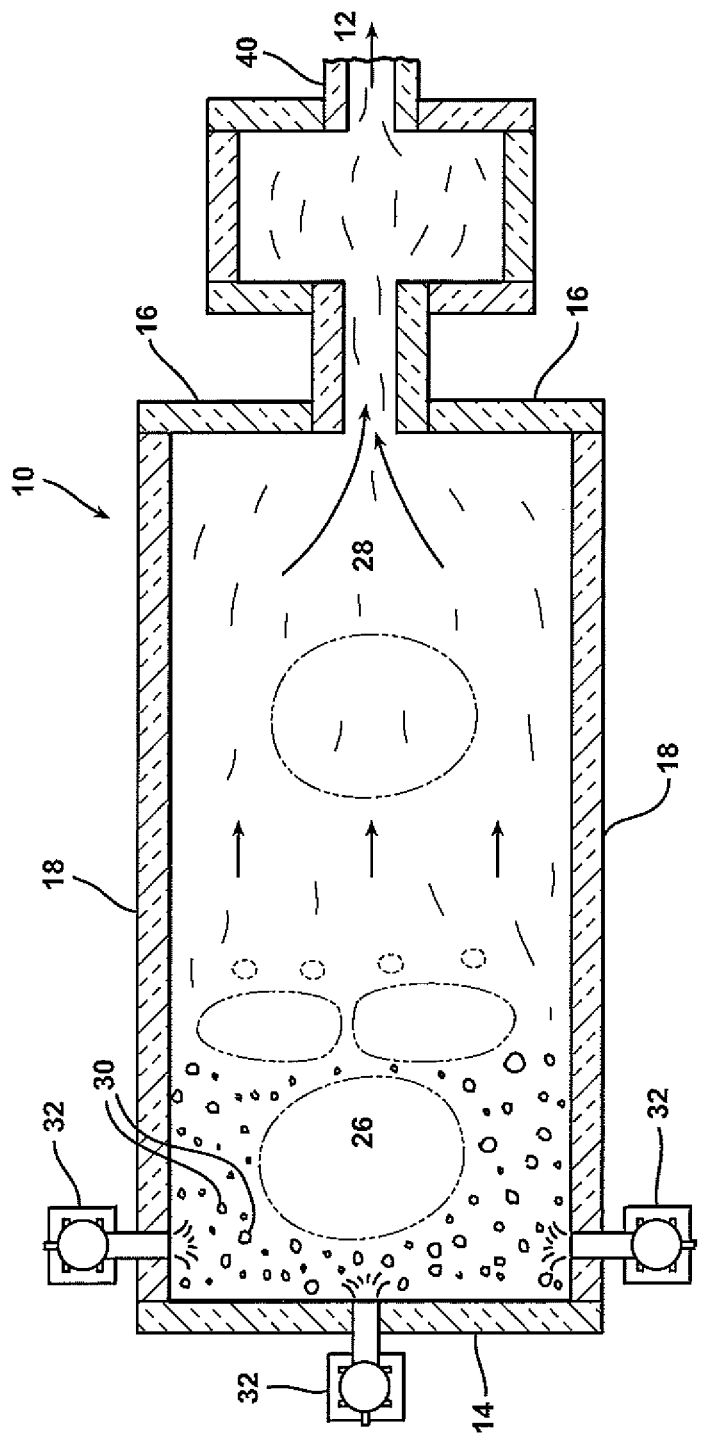
FIG. 2 is a cross-sectional plan view of the glass melting furnace of FIG. 1 taken along line 2-2.
Figure 3:
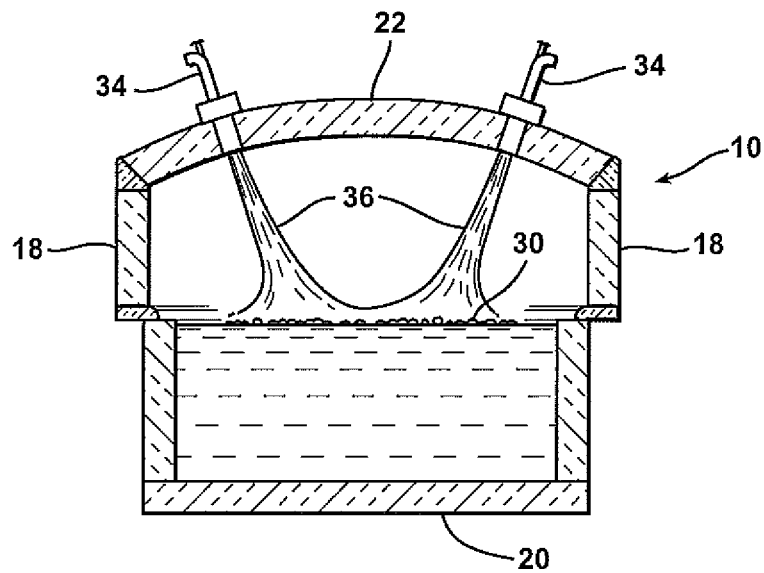
FIG. 3 is a cross-sectional view of the glass melting furnace of FIG. 1 taken along line 3-3 illustrating two burners adjacent the upstream end wall of the furnace.

Fiberizing properties of the glass composition used to form the glass fibers of the present invention include the fiberizing temperature, the liquidus, and delta-T. The fiberizing temperature is defined as the temperature that corresponds to a viscosity of 1000 Poise. As discussed in more detail below, a lowered fiberizing temperature reduces the production cost of the fibers, allows for a longer bushing life, increases throughput, permits the glass to be melted in a refractory-lined melter, and reduces energy usage. For example, at a lower fiberizing temperature, a bushing operates at a cooler temperature and does not "sag" as quickly. Sag is a phenomenon that occurs in bushings that are held at an elevated temperature for extended periods of time. By lowering the fiberizing temperature, the sag rate of the bushing may be reduced and the bushing life can be increased. In addition, a lower fiberizing temperature allows for a higher throughput since more glass can be melted in a given period at a given energy input. As a result, production cost is reduced. In addition, a lower fiberizing temperature will also permit glass formed with the inventive method and composition to be melted in a refractory-lined melter since both its melting and fiberizing temperatures are below the upper use temperatures of many commercially available refractories.

The liquidus is defined as the highest temperature at which equilibrium exists between liquid glass and its primary crystalline phase. At all temperatures above the liquidus, the glass is free from crystals in its primary phase. At temperatures below the liquidus, crystals may form.

Another fiberizing property is delta-T ($\Delta T$), which is defined as the difference between the fiberizing temperature and the liquidus. A larger $\Delta T$ offers a greater degree of flexibility during the formation of the glass fibers and helps to inhibit devitrification of the glass (that is, the formation of crystals within the melt) during melting and fiberizing. Increasing the $\Delta T$ also reduces the production cost of the glass fibers by allowing for a greater bushing life and by providing a wider process window for forming fibers.

The glass compositions employed in the present invention are advantageously suitable for melting in traditional, commercially available refractory-lined glass melters. Starting batch components typically include $SiO_2$ (ground silica sand), and $Al_2O_3$ (calcined alumina), $Li_2CO_3$ (lithium carbonate), $H_3BO_3$ (boric acid), $NaCaB_5O_9 \cdot 8H_2O$ (ulexite), $2CaO \cdot 3B_2O_3 \cdot 5h_2O$ (colmanite) as well as chain modifiers from source materials such as $MgCO_3$ (magnesite), $CaCO_3$ (limestone), $SrCO_3$ (strontianite), $BaCO_3$ (witherite), $ZrSiO_4$ (zircon), and $Na_2CO_3$ (natrite).

FIGS. 1-4 depict a glass melting furnace 10 useful in the method of forming the glass fibers described herein and set forth in the examples and claims below. It may also be desirable to use oxygen-fired heating within the melting furnace, as disclosed in U.S. patent application Ser. No. 10/116,432 entitled "OXYGEN-FIRED FRONT END FOR GLASS FORMING OPERATION", inventors David J Baker et al., and published as U.S. Published Application No. 2003/0188554, herein incorporated in its entirety by reference. The glass melting furnace 10 provides molten glass to a glass forehearth 12. The molten glass is preferably composed of about 64-75 weight % $SiO_2$, 16-24 weight % $Al_2O_3$, 8-12 weight % MgO and 0.25 to 3.0 weight % $R_2O$ where $R_2O$ is the sum of $Li_2O$ and $Na_2O$. In certain embodiments, the composition does not contain more than about 5.0 weight % of oxides or compounds such as CaO, $P_2O_5$, ZnO, $ZrO_2$, SrO, BaO, $SO_3$, $F_2$, $B_2O_3$, $TiO_2$ and $Fe_2O_3$.

In addition, a fiber formed in accordance with the method and composition of the present invention will have a fiberizing temperature of less than 2650° F., and in certain embodiments less than about 2625° F., in other embodiments less than about 2600° F. and in embodiments less than about 2575° F. and a liquidus temperature that is below the fiberizing temperature in certain embodiments by at least 80° F., and in other embodiments by at least about 120° F., and in yet other embodiments by at least about 150° F. Further, the glass fibers of the present invention, in certain embodiments, will have a pristine fiber strength in excess of 680 KPSI, and in certain other embodiments a strength in excess of about 700 KPSI, and in yet other embodiments a strength in excess of about 730 KPSI. Further, the glass fibers will advantageously have a modulus greater than 12.0 MPSI, and in certain embodiments greater than about 12.18 MPSI, and in some embodiments greater than about 12.6 MPSI.

The method of the present invention is preferably performed using the glass melting furnace 10, which includes an elongated channel having an upstream end wall 14, a downstream end wall 16, side walls 18, a floor 20, and a roof 22. Each of the components of the glass melting furnace 10 are made from appropriate refractory materials such as alumina, chromic oxide, silica, alumina-silica, zircon, zirconia-alumina-silica, or similar oxide-based refractory materials. The roof 22 is shown generally as having an arcuate shape transverse to the longitudinal axis of the composition the channel; however, the roof may have any suitable design. The roof 22 is typically positioned between about 3-10 feet above the surface of the glass batch composition 30. The glass batch material 30 is a mixture of raw materials used in the manufacture of glass in the accordance with the present invention. The glass melting furnace 10 may optionally include one more bubblers 24 and/or electrical boost electrodes (not shown). The bubblers 24 and/or electrical boost electrodes increase the temperature of the bulk glass and increase the molten glass circulation under the batch cover.

In addition, the glass melting furnace 10 may include two successive zones, an upstream melting zone 26 and a downstream refining zone 28. In the melting zone 26, the glass batch composition 30 may be charged into the furnace using a charging device 32 of a type well-known in the art.

In one suitable melter configuration, the glass batch material 30 forms a batch layer of solid particles on the surface of the molten glass in the melting zone 26 of the glass melting furnace 10. The floating solid batch particles of the glass batch composition 30 are at least partially melted by at least one burner 34 having a controlled flame shape and length mounted within the roof 22 of the glass melting furnace 10.

Figure 4:
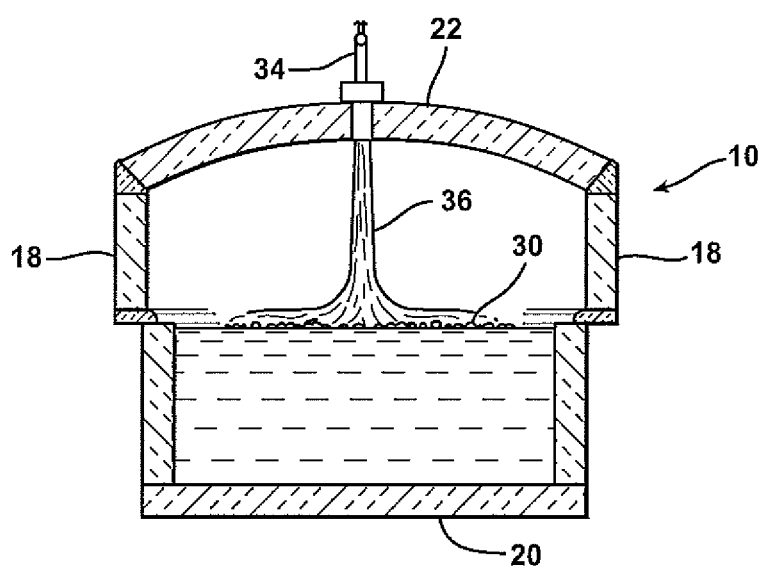
FIG. 4 is an alternate cross-sectional plan view of the glass melting furnace of FIG. 1 taken along line 3-3 illustrating one burner adjacent the upstream end wall of the furnace.

In one preferred embodiment, as shown in FIG. 1, the glass melting furnace 10 includes three burners 34. A single burner 34 is positioned upstream of two adjacently positioned downstream burners 34. However, it will be appreciated that any number of burners 34 may be positioned at any suitable location in the roof 22 of the furnace 10 over the batch to melt the glass batch composition 30. For example, two burners 34 may be positioned in a side-by-side relationship (FIG. 3) or a single burner may be used (FIG. 4).

Other conventional melters may be used without departing from the present invention. Conventional melters include Air-Gas melters, Oxygen-Gas melters, electrically fired melters, or any fossil fuel fired melter. It is possible to add electric boost or bubblers to any of the melting processes. It is also possible to include a separate refining zone (as shown in FIG. 1) or incorporate the refining zone into the main tank of the melter.

Figure 5:
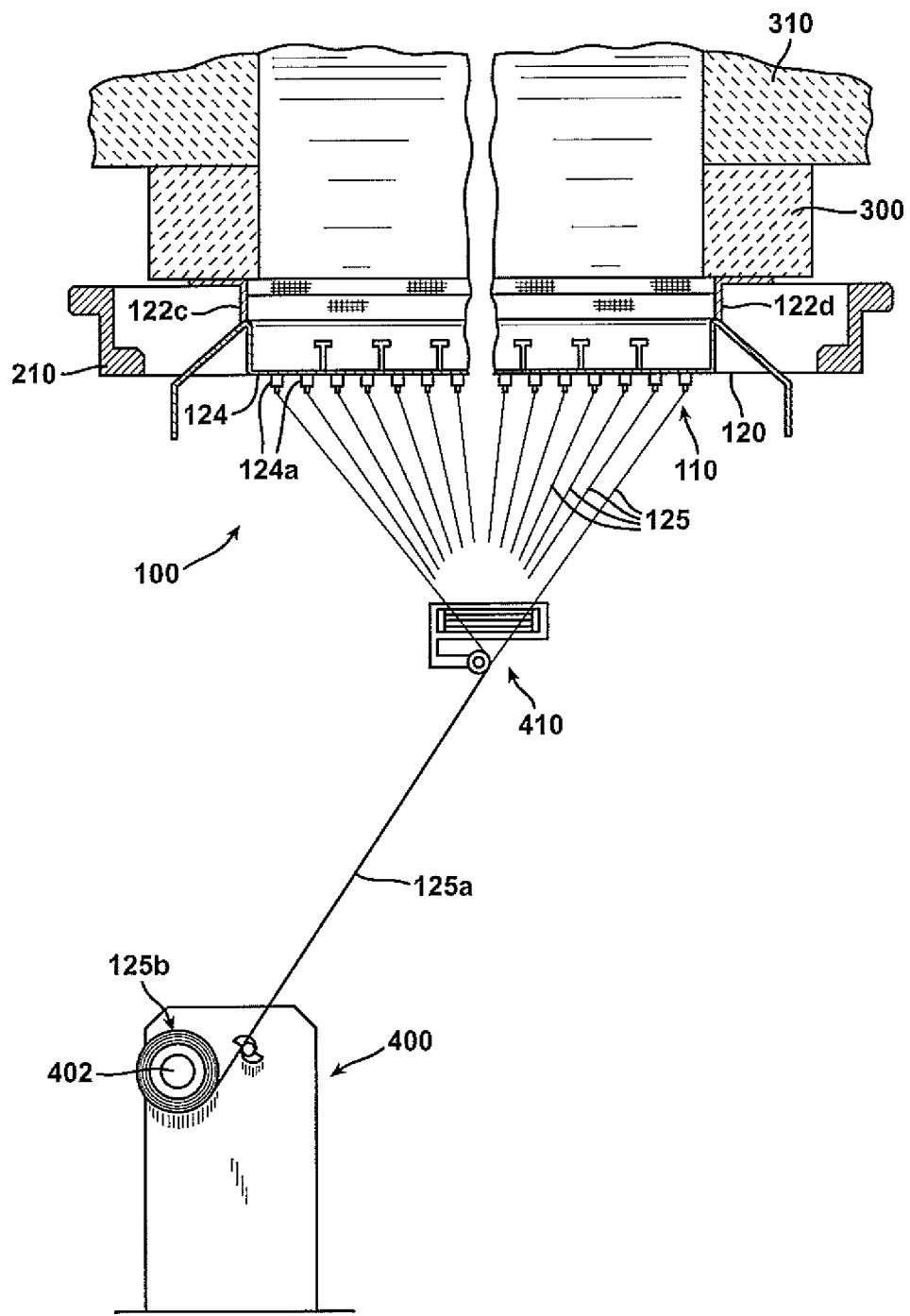
FIG. 5 is a side view, partially in cross section, of a bushing assembly/support structure arrangement for producing continuous glass filaments useful in the method of the present invention.

As shown in FIG. 5, a bushing assembly 100 includes a bushing 110 and a bushing frame 210. The bushing 110 includes a bushing main body 120 with sidewalls 122 and a tip plate 124 extending between the sidewalls 122. The main body 120 is positioned below a bushing block 300 that, in turn, is positioned beneath a forehearth 310. In practicing the method of the present invention, a stream of molten glass is received by the main body 120 from the forehearth 310. The forehearth 310 receives the molten glass from a melter 10 (shown in FIG. 1). A delivery channel 40 is positioned between the melter 10 and the forehearth 310 to deliver the molten glass batch composition 30 from the melter 10 to the forehearth 310. The forehearth 310 and bushing block 300 may be conventional in construction and may be formed from refractory materials.

The tip plate 124 contains a plurality of nozzles 124a (also referred to as orifices) through which a plurality of streams of molten glass may be discharged. The streams of molten material may be mechanically drawn from the tip plate 124 to form continuous filaments 125 via a conventional winder device 400. The filaments 125 may be gathered into a single continuous strand 125a after having received a protective coating of a sizing composition from a sizing applicator 410. The continuous filaments 125a may be wound onto a rotating collet 402 of the winder device 400 to form a package 125b. The continuous filaments 125 may also be processed into other desired composite glass materials including, without limitation, wet use chopped strand fibers, dry use chopped strand fibers, continuous filament mats, chopped strand mats, wet formed mats or air laid mats.

High strength articles of the present invention use the formed fibers described above as glass fiber reinforcement within a polymer matrix material. Typical matrix materials include epoxies, phenolic resins, vinylesters, and polyesters. The articles may be formed by any suitable manufacturing technique including compression molding, laminating, spray up, hand laying, prefabricated lay-up (prepreg), compression molding, vacuum bag molding, pressure bag molding, press molding, transfer molding, vacuum assisted resin transfer molding, pultrusion molding, filament winding, casting, autoclave molding, centrifugal casting resin transfer and continuous casting.

Having generally described this invention, a further understanding can be obtained by reference to certain specific examples illustrated below which are provided for purposes of illustration only and are not intended to be all inclusive or limiting unless otherwise specified.

EXAMPLES

The glasses in the examples listed in Tables IIA-IIC were melted in platinum crucibles or in a continuous platinum-lined melter for determining the mechanical and physical properties of the glass and fibers produced there from. The units of measurement for the physical properties are: Viscosity (° F.), Liquidus temperature (° F.) and $\Delta T$ (° F.). In some examples the glasses were fiberized and Strength (KPsi), Density (g/cc), and Modulus (MPsi) were measured.

The fiberizing temperature was measured using a rotating spindle viscometer. The fiberizing viscosity is defined as 1000 Poise. The liquidus was measured by placing a platinum container filled with glass in a thermal gradient furnace for 16 hours. The greatest temperature at which crystals were present was considered the liquidus temperature. The modulus was measured using the sonic technique on a single fiber of glass. The tensile strength was measured on a pristine single fiber.

TABLE II-A

| Glass | Ex. 1 | Ex. 2 | Ex. 3 | Ex. 4 | Ex. 5 | Ex. 6 |
|---|---|---|---|---|---|---|
| $SiO_2$ | 67.2 | 69 | 67 | 70 | 70 | 65 |
| $Al_2O_3$ | 20 | 22 | 22 | 17 | 17 | 21 |
| MgO | 9.8 | 9 | 11 | 11 | 10 | 11 |
| $Li_2O$ | 3 | 0 | 0 | 2 | 3 | 3 |
| Measured Viscosity (° F.) | 2531 | 2761 | 2648 | 2557 | 2558 | 2461 |
| $1^{st}$ Measured Liquidus (° F.) | 2313 | 2619 | 2597 | 2332 | 2302 | 2296 |
| $2^{nd}$ Measured Liquidus (° F.) | 2302 | 2620 | 2614 | 2346 | 2308 | 2318 |
| $\Delta T$ (° F.) | 218 | 142 | 51 | 225 | 256 | 165 |
| Measured Density (g/cc) | 2.459 | 2.452 | 2.481 | 2.450 | 2.441 | 2.482 |

TABLE II-B

| Glass | Ex. 7 | Ex. 8 | Ex. 9 | Ex. 10 | Ex. 11 | Ex. 12 |
|---|---|---|---|---|---|---|
| $SiO_2$ | 70 | 69 | 70 | 65 | 66 | 65 |
| $Al_2O_3$ | 18 | 17 | 21 | 22 | 22 | 22 |
| MgO | 9 | 11 | 9 | 11 | 9 | 10 |
| $Li_2O$ | 3 | 3 | 0 | 2 | 3 | 3 |
| Measured Viscosity (° F.) | 2544 | 2496 | 2752 | 2525 | 2523 | 2486 |
| $1^{st}$ Measured Liquidus (° F.) | 2311 | 2234 | 2597 | 2468 | 2391 | 2361 |
| $2^{nd}$ Measured Liquidus (° F.) | 2324 | 2343 | 2603 | 2462 | 2394 | 2382 |
| $\Delta T$ (° F.) | 233 | 262 | 155 | 57 | 132 | 125 |
| Measured Density (g/cc) | 2.434 | 2.455 | 2.443 | 2.486 | 2.460 | 2.474 |

TABLE II-C

| Glass | Ex. 13 | Ex. 14 | Ex. 15 | Ex. 16 | Ex. 17 | Ex. 18 |
|---|---|---|---|---|---|---|
| $SiO_2$ | 70 | 67.32 | 67.57 | 68.27 | 68.02 | 67.76 |
| $Al_2O_3$ | 19 | 20.49 | 20.49 | 20.10 | 20.10 | 20.10 |
| MgO | 11 | 10.00 | 10.00 | 9.69 | 9.69 | 9.69 |
| $Li_2O$ | 0 | 2.00 | 1.75 | 1.75 | 2.00 | 2.25 |
| Measured Viscosity (° F.) | 2679 | 2563 | 2584 | 2598 | 2578 | 2547 |
| $1^{st}$ Measured Liquidus (° F.) | 2596 | 2456 | 2486 | 2446 | 2431 | 2399 |
| $2^{nd}$ Measured Liquidus (° F.) | 2582 | 2447 | 2469 | 2469 | 2437 | 2406 |
| ΔT (° F.) | 83 | 111.5 | 106.5 | 140.5 | 144 | 144.5 |
| Measured Density (g/cc) | 2.453 | | 2.461 | | 2.452 | |

The composition of the present invention may also include chain modifiers such as $Na_2O$, CaO and $B_2O_3$. Such compositions are shown in Table II-D (below).

TABLE II-D

| Glass | Ex. 19 | Ex. 21 | Ex. 22 | Ex. 22 | Ex. 23 | Ex. 24 |
|---|---|---|---|---|---|---|
| $SiO_2$ | 75 | 66 | 65 | 65 | 66 | 74 |
| $Al_2O_3$ | 15 | 20 | 20 | 24 | 19 | 15 |
| MgO | 8 | 9 | 8 | 8 | 9 | 8 |
| $Li_2O$ | 1 | 1 | 2 | 0 | 0 | 0 |
| $Na_2O$ | 1 | 2 | 1 | 1 | 2 | 3 |
| CaO | | 2 | 4 | | | |
| $B_2O_3$ | | | | 2 | 4 | |
| Measured Viscosity (° F.) | 2765 | 2607 | 2469 | 2669 | | 2809 |
| $1^{st}$ Measured Liquidus (° F.) | 2422 | 2729 | | 2614 | 2630 | 2680 |
| ΔT (° F.) | 343 | −122 | | 55 | | 129 |

The fibers of the present invention have superior modulus and strength characteristics. The fibers of Example 1 have a Measured Modulus of 12.71 MPsi and a Measured Strength of 688 KPsi. The fibers of Example 3 have a Measured Modulus of 12.96 MPsi and a Measured Strength of 737 KPsi. The fibers of Example 17 have a Measured Modulus of 12.75 MPsi and a Measured Strength of 734 KPsi.

As is understood in the art, the above exemplary inventive compositions do not always total 100% of the listed components due to statistical conventions (such as, rounding and averaging) and the fact that some compositions may include impurities that are not listed. Of course, the actual amounts of all components, including any impurities, in a composition always total 100%. Furthermore, it should be understood that where small quantities of components are specified in the compositions, for example, quantities on the order of about 0.05 weight percent or less, those components may be present in the form of trace impurities present in the raw materials, rather than intentionally added.

Additionally, components may be added to the batch composition, for example, to facilitate processing, that are later eliminated, thereby forming a glass composition that is essentially free of such components. Thus, for instance, minute quantities of components such as fluorine and sulfate may be present as trace impurities in the raw materials providing the silica, lithia, alumina, and magnesia components in commercial practice of the invention or they may be processing aids that are essentially removed during manufacture.

As is apparent from the above examples, glass fiber compositions of the invention have advantageous properties, such as low fiberizing temperatures and wide differences between the liquidus temperatures and the fiberizing temperatures (high ΔT values). Other advantages and obvious modifications of the invention will be apparent to the artisan from the above description and further through practice of the invention). The high-performance glass of the present invention melts and refines at relatively low temperatures, has a workable viscosity over a wide range of relatively low temperatures, and a low liquidus temperature range.

The invention of this application has been described above both generically and with regard to specific embodiments. Although the invention has been set forth in what is believed to be the preferred embodiments, a wide variety of alternatives known to those of skill in the art can be selected within the generic disclosure. Other advantages and obvious modifications of the invention will be apparent to the artisan from the above description and further through practice of the invention. The invention is not otherwise limited, except for the recitation of the claims set forth below.

We claim:

1. A process for producing glass from raw glass-forming material in a refractory-lined glass melter, the glass melter having a roof, a bottom and side walls, defining an elongated channel having a melting zone and a downstream refining zone, the process comprising the steps of:
    charging raw glass batch to the melting zone of the refractory-lined glass melter, the glass batch comprising:
        68-69 weight percent $SiO_2$;
        20-22 weight percent $Al_2O_3$;
        9-10 weight percent MgO;
        no more than 2.0 weight percent CaO; and
        1-3 weight percent $Li_2O$;
    providing at least one burner within the roof of the glass melter; and
    melting the glass batch to form a fiberizable molten glass, wherein said molten glass produced has a fiberizing temperature of less than about 2650° F.

2. The process of claim 1, wherein said glass fibers produced have a strength of greater than about 700 KPsi.

3. The process of claim 1, wherein the glass batch comprises:
    less than 5 weight percent total of compounds selected from the group consisting of $P_2O_3$, ZnO, $ZrO_2$, SrO, BaO, $SO_3$, F2, $B_2O_3$, $TiO_2$ and $Fe_2O_3$.

4. The process of claim 1, wherein glass produced from the batch is fiberized at a foiniing temperature of less than 2600° F.

5. The process of claim 1, wherein said molten glass produced from the batch has a liquidus temperature, wherein the difference (ΔT) between the fiberizing temperature and the liquidus temperature is 140° F.

6. A process for producing glass fibers from raw glass batch in a refractory-lined glass melter, the process comprising the steps of:
- charging raw glass batch to the melting zone of a refractory-lined glass melter, the glass batch comprising:
  - about 68-69 weight percent $SiO_2$;
  - about 20-22 weight percent $Al_2O_3$;
  - about 9-10 weight percent MgO;
  - no more than 2.0 weight percent CaO; and
  - about 1-3 weight percent $Li_2O$,
- heating the glass batch to form a fiberizable molten glass having a fiberizing temperature of less than about 2650° F.; and
- fiberizing said molten glass to produce glass fibers having a strength of greater than about 700 KPsi.

* * * * *